Jan. 7, 1930.                H. L. WORBOIS                1,742,743
                               OIL FILTER
                           Filed July 16, 1925
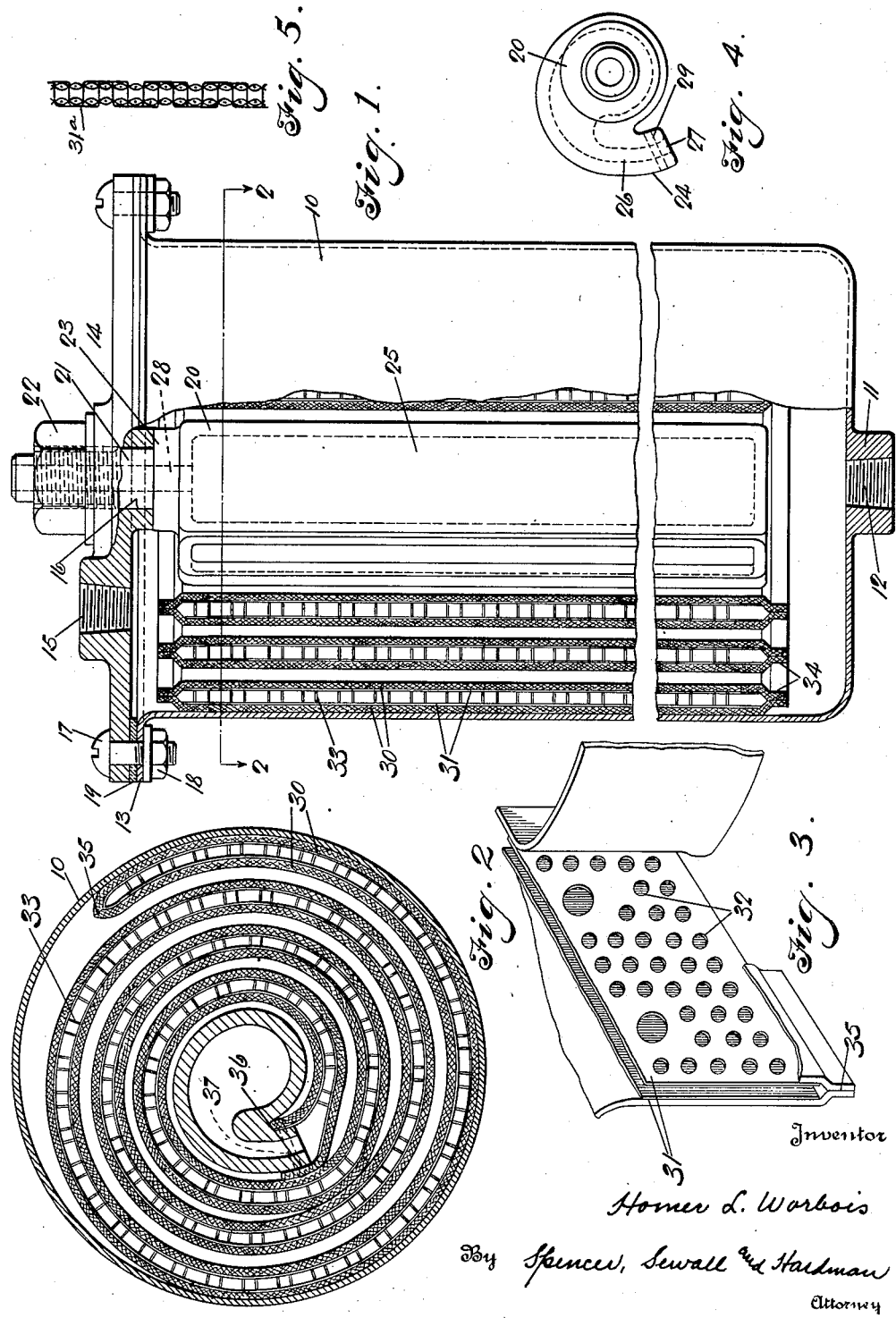

Patented Jan. 7, 1930

1,742,743

UNITED STATES PATENT OFFICE

HOMER L. WORBOIS, OF DAYTON, OHIO, ASSIGNOR TO GENERAL MOTORS RESEARCH CORPORATION, OF DAYTON, OHIO, A CORPORATION OF DELAWARE

OIL FILTER

Application filed July 16, 1925. Serial No. 43,984.

This invention relates to filters particularly intended for use in the lubrication systems of internal-combustion engines, in order to remove, from the lubricating oil being circulated, grit or other solid particles which cause wear in the cylinders and bearings of an engine when circulated with the oil.

Objects of the invention are to simplify the construction of oil filters for the uses mentioned; to enable the filtering material to be quickly removed and replaced or cleansed; to afford very large filtering surfaces in relatively small space, and to supply a clean-fluid chamber with walls of fibrous filtering fabric in the form of a long, thin, flexible tube, which may be folded or coiled to fit various forms of filtering containers.

The invention consists, specifically, of a filtering container having a dirty-fluid and a clean-fluid chamber; said container having a removable cover, to which is secured a hollow core, or other fluid-conduit, discharging through said cover, and having a clean-fluid inlet from the clean-oil chamber within the container; said clean-oil chamber consisting of a tubular fabric of extensive surface surrounding foraminous, flexible stiffening material, said clean-oil chamber being arranged with overlapping portions suitably spaced from each other.

In the accompanying drawings, in which like reference characters indicate like parts throughout the several views:

Fig. 1 is a view partly in side elevation and partly in longitudinal section, illustrating one embodiment of the invention;

Fig. 2 is a cross-section on line 2—2 of Fig. 1;

Fig. 3 is a perspective showing a fragment of the clean-fluid chamber with a portion of the filtering fabric forming the filtering walls thereof turned outward to show flexible foraminous stiffening plates within;

Fig. 4 is a top plan view of the clean-fluid conducting core, adapted to be suspended within the filtering container; and Fig. 5 is a section through a fragment of interwoven wire fabric adapted to serve as a foraminous flexible stiffener in place of the foraminous plates shown in Fig. 3.

In the drawings, the filtering container is indicated by numeral 10. This container may be made of any suitable material, such as drawn sheet metal. At the bottom of the container 10, is a boss 11, provided with a threaded perforation 12 adapted to receive a removable plug for the purpose of draining away sediment, or emptying the filter when desired. The boss 11 may be formed in any desired manner. It may be welded onto the bottom of the container 10, if said container is made by die-drawing from sheet metal. The container 10 is provided at its upper end with a flange 13 provided with bolt holes. Removably secured to the flange 13 is a cover 14, which may be of cast metal. This cover has an inlet 15 for fluid to be filtered which, as shown, is suitably threaded to receive a pipe coupling, in order to connect the dirty or unfiltered fluid chamber of the filter with the oil or other supply line. There is another opening 16, which, in this embodiment, is disposed in the center of the cover, and this opening 16 is for the purpose of receiving a conducting member, through which clean fluid issues from the clean or filtered fluid chamber of the filter. The cover 14 is provided with holes adjacent its periphery, said holes being so disposed as to register with the holes in flange 13. The cover may be secured removably to the container 10, by means of bolts 17 and nuts 18, a gasket 19 being interposed between the cover and the flange.

Suspended from the cover 14 and adapted to be removed from the container with said cover, is a fitting or core 20, which is hollow and forms a part of the clean-fluid chamber within the container 10. Core 20 may be made of cast metal, such as iron. The upper end of it is formed with a reduced neck 21, threaded on the exterior to receive a nut 22. The reduced neck 21 terminates in a shoulder 23 adapted to abut against the inner face of cover 14. Below the shoulder 23 the core expands into a body of larger diameter, which may be described as having a cross-section of snail-like form, as illustrated in Fig. 4. This body is formed with a lip 24 extending longitudinally of it. The body contains a chamber 25 communicating with the interior of the container by means of a passage 26, terminating at one end in an elongated slot 27, and communicating with the exterior of the container by passage 28 through the neck 21. Formed transversely through the lip 24, are perforations 29, adapted to receive pins for securing the filtering element of the clean-fluid chamber to said lip.

The filtering element of the clean-fluid chamber consists of a long boot or tube of fabric 30, which may be canton flannel, open at one end. This tube or bag is preferably thin and relatively wide. The fabric of which it is composed permits the passage of clear fluid, but prevents the passage of dirt and grit. The walls of the fabric tube are stiffened and spaced apart, as by two thin sheets 31 of flexible foraminous material. For illustrative purposes, the spacing and stiffening means are shown in Fig. 3 as sheets of thin, flexible metal having a large number of holes 32 formed therein, as by punching, so as to allow free passage of fluid through them into the space between. Said stiffening plates 31 must be spaced apart a desired distance. The spacing may be effected by interposed struts 33, such as bits of wire soldered, or otherwise connected, by burrs struck from the metal of the sheets, or otherwise. The boot or tube 30, in the embodiment shown, is stitched at both edges, as at 34, while its outer end at 35 may be closed by stitching, or may be a fold or bight in the strip of fabric. The inner or open end of said tube is attached to the lip 24 of core 20, by spreading the inner ends of plates 31, as at 36, and pinning the inner ends of said plates and said tube to said lip, by means of pins 37 passed through the plates and fabric and the perforations 29 in the lip. Thus, the inner end of the tubular filtering chamber is pulled over the lip 24 and removably secured thereto.

As an alternative form of flexible foraminous stiffening means for preventing the collapse of the fabric tube and providing space for free flow of the filtered fluid to the clean-fluid outlet, an interwoven wire fabric 31ª, similar to that shown in Fig. 5, may be used.

In the embodiment shown, the clean-oil chamber comprising the filtering tube 30 and stiffening plates, is rolled into spiral form, the turns of the spiral being suitably separated to afford free access between the turns of the fluid to be filtered. It will be obvious that portions of the flexible tube may be caused to overlap in other forms than that shown, whereby an exceedingly large filtering surface may be had within relatively small space.

The oil, or other fluid to be filtered, enters the dirty-fluid chamber within the container 10, through the inlet opening 15. With drain hole 12 plugged, the fluid cannot escape from the container 10, except through the pervious fabric 30, into the space between the stiffening plates, through the slot 27, passage 26, to the interior 25 of core 20, and out through the passage 28 in the neck 21 of said core.

Should the filter become clogged, bolts 17 may be removed, cover 14 lifted from the container 12, carrying with it the clean-fluid chamber comprising the core 20 and the filtering tube composed of the fabric 30 and stiffening plates 31 or stiffening fabric 31ª. The folded or coiled tube may then be seized by the end and straightened out. Access may then be had to the pins 37, which may be removed. Then the boot or tube of fabric may be slipped from the stiffening plates and replaced by a clean tube. The clogged or dirty fabric tube may be washed, if desired, and used again.

It will be seen that in a filter of this construction, the filtering material, can be very easily and quickly renewed. In the uses for which this filter was intended it is exceedingly important that the oil filter shall be efficient and susceptible or renovation with little trouble, since it cannot be expected that the average operator of a motor car will take sufficient time and trouble to keep in order a filter which cannot be renovated readily. It is coming to be recognized that the presence of grit in the lubricating oil is a serious detriment to the durability of an engine and a material factor in the causes of frequent replacements and repairs.

While the forms of embodiment of the invention as herein disclosed, constitute preferred forms, it is to be understood that other forms might be adopted, all coming within the scope of the claims which follow.

What is claimed is as follows:

1. A filter comprising a container having an inlet for fluid to be filtered; a hollow core suspended within said container, said core having a lateral elongated inlet formed in a lip extending from said core and an outlet for clean fluid extending to the exterior of said container; and a relatively wide and thin tube of fabric surrounding flexible, foraminous stiffening means adapted to separate the walls of said tube of fabric, said tube being telescoped with said lip and detachably secured thereto.

2. A filter comprising a container having an inlet for fluid to be filtered; a hollow core suspended within said container, said core having a lateral elongated lip provided with an elongated inlet tangentially disposed with respect to the space within the core, and an outlet for clean fluid extending to the exterior of said container; a relatively wide and thin tube of fabric surrounding flexible, foraminous stiffening means adapted to separate the walls of said tube of fabric, said tube of fabric being telescoped with said lip and detachably secured thereto.

3. A filter comprising a container having an opening, a hollow core supported within said container in communication with said opening, said core having a lateral elongated aperture formed with a lip extending from said core, and a relatively wide and thin tube of fabric rolled in spiral form, said tube having its open end secured to said core in telescoping relation with said lip.

In testimony whereof I hereto affix my signature.

HOMER L. WORBOIS.